(12) United States Patent
Ainsworth

(10) Patent No.: US 8,714,486 B2
(45) Date of Patent: May 6, 2014

(54) HYBRID FRAME CO-MOLD MANUFACTURE

(75) Inventor: Bobby Jack Ainsworth, Sapulpa, OK (US)

(73) Assignee: The NORDAM Group, INC., Tulsa, OK (US)

( * ) Notice: Subject to any disclaimer, the term of this patent is extended or adjusted under 35 U.S.C. 154(b) by 409 days.

(21) Appl. No.: 13/295,130

(22) Filed: Nov. 14, 2011

(65) Prior Publication Data

US 2012/0119031 A1  May 17, 2012

Related U.S. Application Data

(60) Provisional application No. 61/414,094, filed on Nov. 16, 2010.

(51) Int. Cl.
*B64C 1/14* (2006.01)

(52) U.S. Cl.
USPC ........................ 244/129.3; 244/121

(58) Field of Classification Search
USPC .............. 244/129.3, 121, 131; 296/201
See application file for complete search history.

(56) References Cited

U.S. PATENT DOCUMENTS

| | | | |
|---|---|---|---|
| 2,511,168 A | 6/1950 | Martin et al. |
| 4,333,381 A | 6/1982 | Boeglin et al. |
| 4,364,533 A | 12/1982 | Pompei et al. |
| 4,793,108 A | 12/1988 | Bain et al. |
| 5,346,367 A | 9/1994 | Doolin et al. |
| 5,443,912 A | 8/1995 | Olson |
| 5,462,243 A | 10/1995 | Hart et al. |
| 5,506,057 A | 4/1996 | Olson |
| 6,472,083 B1 | 10/2002 | Krebs et al. |
| 6,924,021 B1 | 8/2005 | Colegrove et al. |
| 7,028,950 B2 | 4/2006 | Salmon et al. |
| 7,080,807 B2 | 7/2006 | Olson et al. |
| 7,118,070 B2 | 10/2006 | Abrams et al. |
| 7,300,693 B2 | 11/2007 | Albers et al. |
| 7,988,094 B2 | 8/2011 | Ostrem et al. |
| 2003/0234322 A1 | 12/2003 | Bladt et al. |
| 2004/0262453 A1 | 12/2004 | Sanz et al. |
| 2006/0284016 A1 | 12/2006 | Balsillie et al. |
| 2007/0075187 A1 | 4/2007 | Bold |
| 2007/0095984 A1 | 5/2007 | Wood |
| 2007/0181746 A1 | 8/2007 | Wood |
| 2007/0194177 A1 | 8/2007 | Coak |
| 2007/0228217 A1 | 10/2007 | Bold |
| 2008/0048068 A1 | 2/2008 | Bold |
| 2008/0054122 A1 | 3/2008 | Bold |
| 2008/0078876 A1 | 4/2008 | Baggette et al. |
| 2008/0078878 A1 | 4/2008 | Bold |
| 2008/0169380 A1 | 7/2008 | Jackson et al. |
| 2008/0172959 A1 | 7/2008 | Pellenkoft et al. |
| 2008/0191095 A1 | 8/2008 | Bold |
| 2008/0197237 A1 | 8/2008 | Bold |
| 2008/0217479 A1 | 9/2008 | Wood |

*Primary Examiner* — Christopher P Ellis
(74) *Attorney, Agent, or Firm* — Francis L. Conte

(57) ABSTRACT

A hybrid frame is fabricated by initially forming a stack of fibrous layers in an annular pattern. An annular metal trim is separately formed to conform with the annular pattern. The trim is trapped in a lower mold having a complementary lower mold channel. The stacked layers are trapped atop the trim in the lower mold channel. An upper mold is pressed atop the stacked layers for compression co-molding together in the lower mold the stacked layers and trim to co-form the hybrid frame.

20 Claims, 7 Drawing Sheets

HYBRID FRAME CO-MOLD MANUFACTURE

This application claims the benefit of U.S. Provisional Application No. 61/414,094; filed Nov. 16, 2010.

BACKGROUND OF THE INVENTION

The present invention relates generally to aircraft, and, more specifically, to windows therein.

In the typical commercial aircraft, numerous windows are distributed along both sides of the fuselage between the cockpit and tail. Each window includes a frame suitably mounted in a corresponding aperture in the external skin of the aircraft, and each frame securely mounts therein a corresponding window pane.

Typical aircraft skins are made of high strength metal, such as aluminum, and the typical window frame is also made of high strength metal.

Since aircraft weight directly affects aircraft efficiency during flight, aircraft are continually improved for reducing weight while providing sufficient strength for the various aircraft components to enjoy long service life during commercial operation.

US Patent Application Publication 2008/0169380A1 discloses a non-metal composite window frame having carbon fiber laminates manufactured by compression molding for reducing weight while providing high strength.

U.S. Pat. No. 7,988,094 discloses a corresponding titanium erosion shield for protecting the composite window frame during aircraft flight.

The composite window frame and metal erosion shield are initially separately manufactured and then bonded together to form the finished assembly for mounting window panes in the aircraft.

The assembly process includes many steps to accurately position the shield in the frame and ensure maximum strength thereof.

In one development process, these steps include machining of the composite frame to accept the titanium erosion shield ring and drilling holes in the frame. The composite material and the titanium ring then go through a secondary bonding step where the operator adds a secondary adhesive or sealant, such as rubber, to glue or adhere the titanium ring onto the window frame.

After completion of the secondary bonding step, the glued composite material and titanium ring undergo a second cooking/pressing, following which the assembly is removed from the molding tool and cleaned to remove stray sealant.

Following the clean up step, the assembly is inspected around the areas containing sealant, and any voids thereof are sealed. The window frame with titanium shield goes through another inspection step to ensure that the sealant is not excessive.

After ensuring acceptable bonding of the shield to the frame, the window frame is painted, and then finally inspected for delivery to the customer.

The final composite window frame and attached shield have reduced weight and high strength attributable to the elaborate process of manufacture, but with attendant manufacturing cost.

Accordingly, it is desired to provide an improved method of manufacture of an aircraft window frame for reducing cost while ensuring high strength with low weight.

BRIEF DESCRIPTION OF THE INVENTION

A hybrid frame is fabricated by initially forming a stack of fibrous layers in an annular pattern. An annular metal trim is separately formed to conform with the annular pattern. The trim is trapped in a lower mold having a complementary lower mold channel. The stacked layers are trapped atop the trim in the lower mold channel. An upper mold is pressed atop the stacked layers for compression co-molding together in the lower mold the stacked layers and trim to co-form the hybrid frame.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
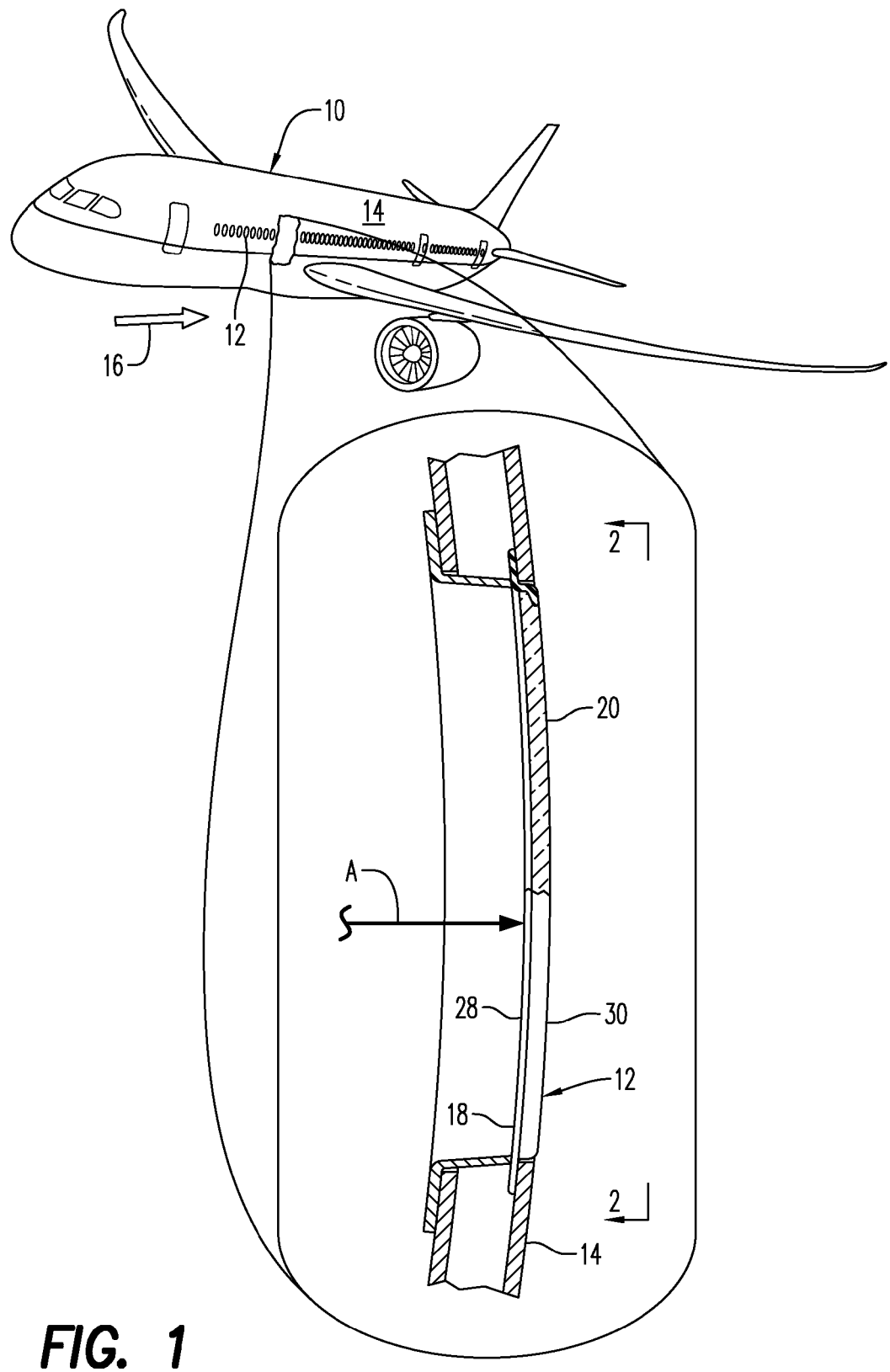
FIG. 1 illustrates an exemplary commercial aircraft in flight, with an enlarged elevational sectional view of the one of the numerous windows found therein.

FIG. 1 illustrates an exemplary airplane or aircraft 10 powered by turbofan gas turbine engines in flight. The aircraft includes numerous windows 12 arranged in rows along both sides of the fuselage or outer skin 14 from the cockpit forward end of the aircraft to just before the aft tail.

The windows maintain the pressure integrity of the cabin and protect the passengers therein from the external environment, including the fast stream of external air 16 flowing aft over the outer skin during aircraft flight.

Each window is suitably mounted through a corresponding aperture in the aircraft skin 14, and the windows vary in size and configuration along the length of the aircraft. Since the fuselage 14 is generally cylindrical or tubular it has an internal diameter, or radius A which varies along the length of the aircraft from the sharp nose, through the wide passenger body, and to the sharp tail.

Each window 12 is specifically sized and configured to match the local curvature, or radius A, of the aircraft skin, and therefore many differently sized windows are required for each aircraft, and must be manufactured during production with corresponding differences.

The numerous windows in the aircraft may be identical in design but may suitably vary in configuration, including size and curvature thereof. An exemplary window 12 is initially illustrated in transverse section in FIG. 1 and in plan view in FIG. 2. Each window includes a composite window frame 18 in which is suitably mounted a conventional, transparent window pane 20. The frame 18 itself is suitably mounted through the corresponding aperture in the aircraft skin 14 and supports the pane therein.

Figure 3:
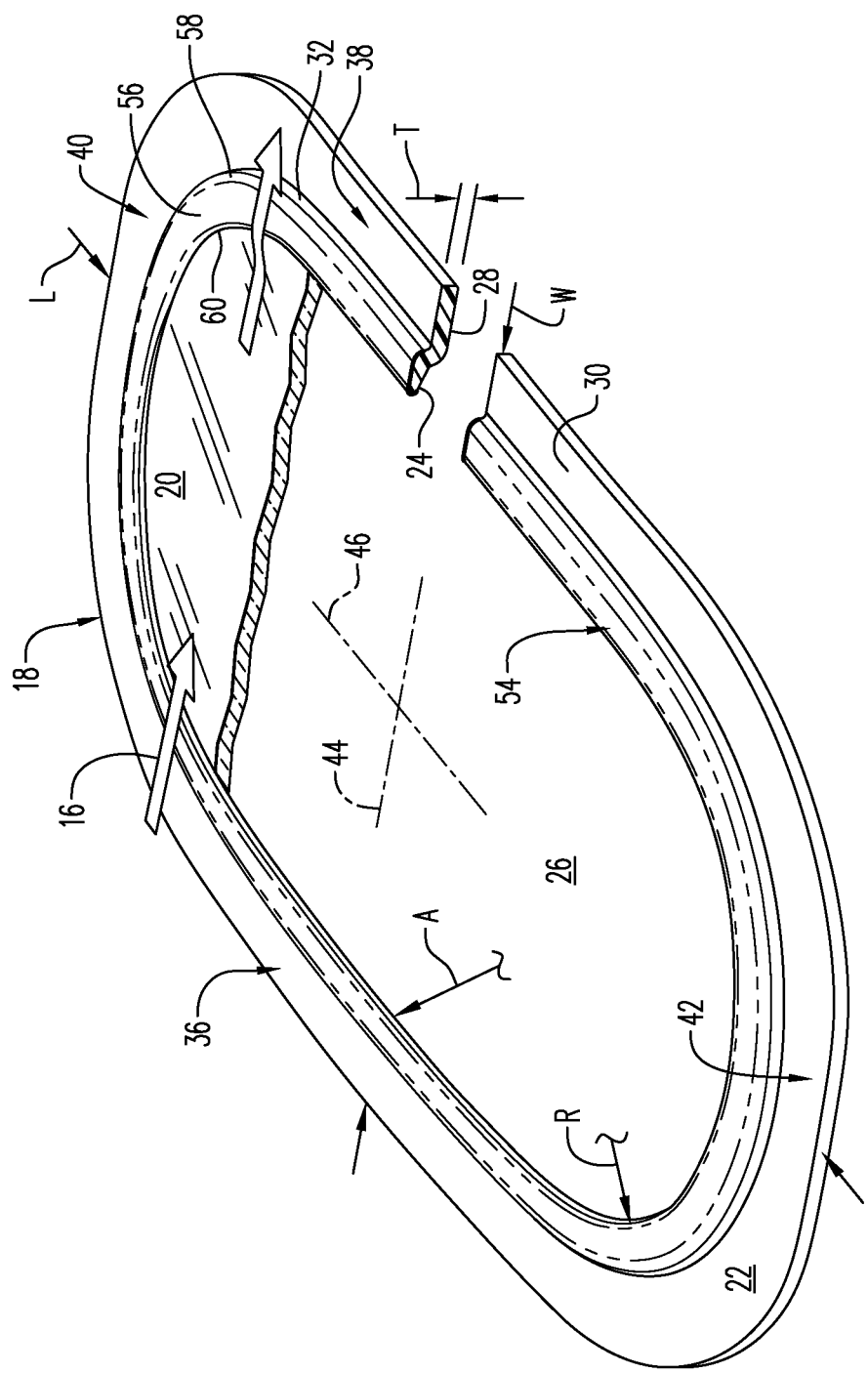
FIG. 3 is a partly sectional, isometric view of the exemplary window illustrated in FIG. 2 taken in isolation from the aircraft.
Figure 4:
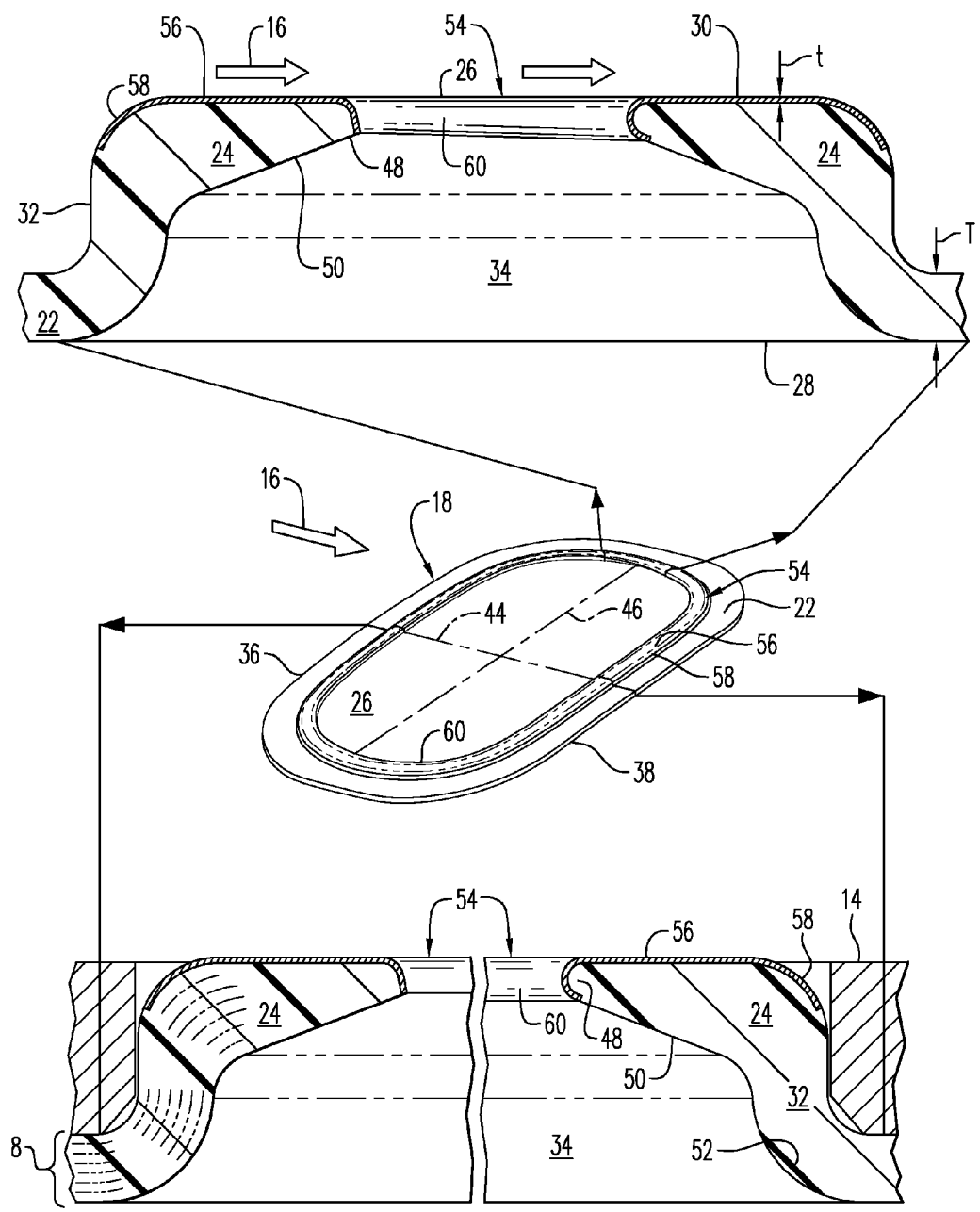
FIG. 4 is an exploded view of the window illustrated in FIG. 3 showing various radial transverse sections and laminated configuration of the composite layers and integral metal erosion shield.

The composite frame 18 is illustrated in more detail in an exemplary embodiment in FIGS. 3 and 4. The frame includes a radially outer annular flange or rim 22 and a concentric, radially inner annular flange or sash 24 surrounding a central aperture 26 which is sealingly closed by the window pane 20 mounted therein.

The sash 24 is transversely offset from the rim 22 across the thickness T thereof in common laminations across that thickness. The laminated rim and sash include a plurality of lamina or layers 8 which extend laterally or radially therethrough along the radial axis R of the frame.

The lamination layers 8 are preferably different from each other transversely between the opposite inboard and outboard sides 28,30 of the frame which correspond with the inboard or internal side of the aircraft cabin and the outboard or external side of the aircraft skin.

The sash 24 illustrated in FIG. 4 is elevated above and transversely bridged to the lower rim 22 by an annular rib 32 around the full circumference of the central aperture 26. The inboard side of the sash 24 and rib 32 define a central pocket 34 in which the window pane 20 may be mounted. The sash 24, or sash bar, defines an annular muntin in which the window pane 20 may be mounted and trapped, and withstands the differential pressure exerted across the window from the pressurized aircraft cabin.

Figure 2:
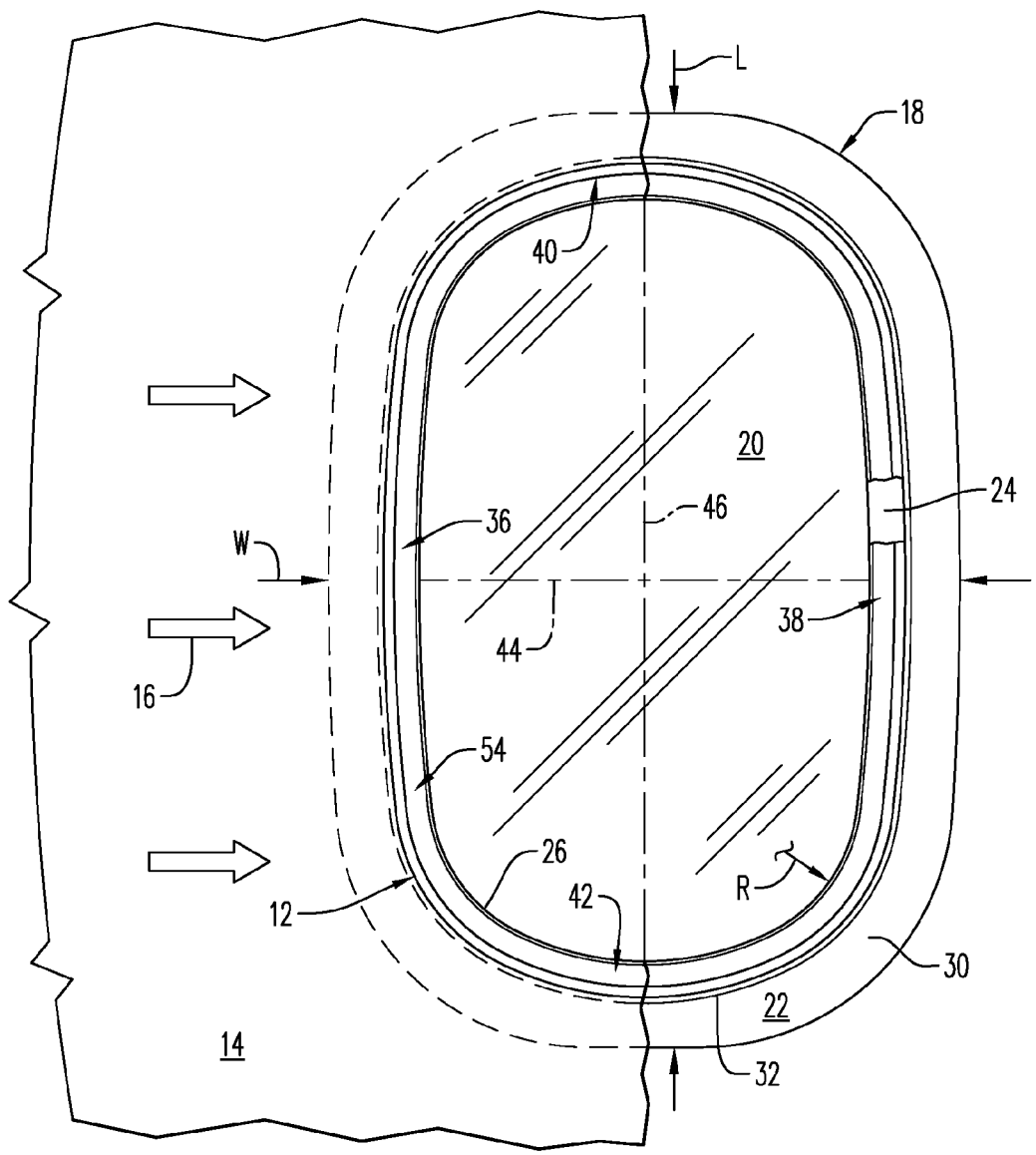
FIG. 2 is an elevation view of the outboard side of the exemplary window illustrated in FIG. 1 mounted in a portion of the fuselage and taken along line 2-2.

The rim 22, sash 24, and rib 32 are integral with each other in a single or unitary component, and are continuous in circumference around the central aperture 26 illustrated in FIGS. 2 and 3.

The integral rim, sash, and rib therefore collectively define forward and aft vertical columns or posts 36,38, and upper and lower horizontal rails 40,42 integrally joined to the opposite ends thereof.

The posts 36,38 are spaced apart laterally or horizontally along a minor axis 44 of the frame 18, and define the horizontal width W of the frame. And, the posts 36,38 are concave inboard and convex outboard to match the curvature or radius A of the fuselage 14.

The two rails 40,42 are spaced apart longitudinally or vertically along a longer major axis 46 of the frame and define the height or length L thereof.

The two side posts 36,38 laterally bound the central aperture 26, and the two rails 40,42 provide an upper header and lower sill which vertically bound the central aperture 26, and collectively, the posts and rails completely surround the central aperture 26 laterally or circumferentially.

The rim 22 illustrated in FIGS. 3 and 4 has a preferably uniform thickness T from the outer perimeter of the frame to its junction with the perpendicular rib 32 and provides sufficient surface area for structurally attaching the window frame to the aircraft skin typically using bolts or other suitable fasteners.

Correspondingly, the sash 24 tapers or decreases in transverse thickness T radially inwardly from its junction with the rib 32 to the radially inner perimeter of the sash which defines a relatively thin arcuate lip 48 that circumferentially surrounds or bounds the central aperture 26.

In the preferred embodiment, the outboard side 30 along the sash 24 is generally parallel to the inboard side 28 along the rim 22 in two different generally flat planes spaced transversely apart by the bridging rib 32.

Correspondingly, the inboard side 28 of the sash 24 slopes radially outwardly toward the offset lower rim 22 to its junction with the transition rib 32 to form a sloped annular seat 50 completely surrounding the window pane 20 which has a corresponding beveled perimeter conforming with the seat bevel.

In this way, differential pressure loads acting on the window pane during flight are carried through the beveled joint to the tapered sash 24, which sash 24 has a relatively thick arcuate fillet or junction with the transition rib 32 for in turn carrying the pressure loads to the surrounding rim with reduced stress.

The rim 22, rib 32, and sash 24 illustrated in FIG. 4 provide a continuous structural loadpath between the concentric outer and inner perimeters of the frame, and the common layers 8 extend radially therethrough and comprise high-strength fibrous laminae fixedly bound in a rigid resin matrix 52 illustrated schematically in FIG. 4.

The different layers 8 illustrated in FIG. 4 preferably include an externally exposed outboard layer facing outwardly from the aircraft to the environment, a transversely opposite, internally exposed inboard layer facing inwardly in the aircraft cabin, and a plurality of different inside or middle layers laminated and hidden between the opposite outboard and inboard layers.

Additional protection for the composite window frame is provided by bonding an annular erosion shield or trim piece 54 to the outboard side of the sash 24 as shown in FIGS. 2-4. The erosion shield is preferably thin sheet metal, such as titanium, and provides a continuous metal annulus along the posts 36,38 and rails 40,42 completely surrounding the central aperture 26 to protect against wind and rain erosion.

The height or depth of the offset between the sash 24 and rim 22 illustrated in FIG. 4 is selected to match the thickness of the surrounding aircraft skin 14 so that the outboard surface of the sash will be substantially flush with the outboard surface of the aircraft skin.

Correspondingly, the thin erosion shield 54 is recessed in the sash and projects slightly proud or outboard of the aircraft skin to provide a slightly elevated relief for ensuring that the erosion shield takes the wind and rain erosion instead of the fibrous layers, window pane, and edge of the skin. The slight protrusion of the erosion shield nevertheless provides smooth aerodynamic flow of the ambient air 16 as it flows past the window during aircraft operation at speed.

Furthermore, the erosion shield 54 illustrated in FIG. 4 conforms with the flat outboard surface of the sash and has arcuate opposite edges blending inwardly into the aircraft. For example, the erosion shield 54 preferably wraps in part around the sash lip 48 to minimize or eliminate direct exposure of the underlying composite laminate to the external free stream air 16 which can contain rain or debris particles that would otherwise erode the relatively softer composite sash.

The composite laminated window frame 18 illustrated in FIG. 3 enjoys specific advantages in design, strength, and manufacture, as well as in the cost of manufacture and durability in service life. The window frame 18 is defined by its common rim 22, sash 24, and transition rib 32 which may be suitably varied in size, thickness, and configuration, with corresponding differences in length L, width W, and curvature in different planes represented by the annular radius R of the window frame itself, as well as the vertical curvature A of the window frame conforming with the local curvature of the tubular aircraft cabin.

The erosion shield 54 is illustrated in more detail in FIG. 4. The shield is a unitary or one-piece component having an annular band 56 integrally formed with a radially outer brim 58 and radially inner hook or clip 60. These three components of band 56, brim 58, and clip 60 define in its entirety the relatively simple erosion shield 54 which is preferably formed from a unitary metal sheet, or sheet metal, having a constant thickness t.

The sheet metal shield 54 is preferably formed of thin titanium with a small thickness t of about 8 mils (0.2 mm) for being lightweight and having enhanced strength, durability, and elastic and plastic flexibility.

The band 56 forms the middle annulus of the shield and is flat sheet metal for its smooth inboard and outboard surfaces.

The outer brim 58 is transversely arcuate and forms an outwardly convex bullnose smoothly blending with the flat band 56, and the inner clip 60 is also transversely arcuate and forms another outwardly convex bullnose also blending smoothly with the flat bend 56.

The outer brim 58 provides an external bullnose which is aerodynamically smooth on the outboard side of the shield and blends into the aircraft skin, and similarly the inner clip 60 provides another smooth external bullnose along the opposite edge of the middle band and blends smoothly with the window pane.

Under the original development of the composite window frame 18 and titanium erosion shield 54, these parts were separately fabricated in different processes, and then suitably bonded together in yet another process which correspondingly increased cost and inherently effected the structural configuration of the assembly.

Further developments have now improved both the fabrication process and the structural configuration of the composite window frame 18 as presented hereinbelow.

In accordance with conventional practice, the individual fibrous layers 8 and titanium erosion shield 54 may be conventionally formed in their corresponding fabrication processes for the many advantages attributable thereto.

But, the compression molding process is preferentially modified herein to directly co-bond together the metal shield 54 and fiber layers 8 using the same molding resin 52 itself, and thereby eliminate the previous bonding adhesive and corresponding extra bonding steps, along with corresponding weight reduction, while maintaining strength of the resulting hybrid frame 18.

Figure 5:
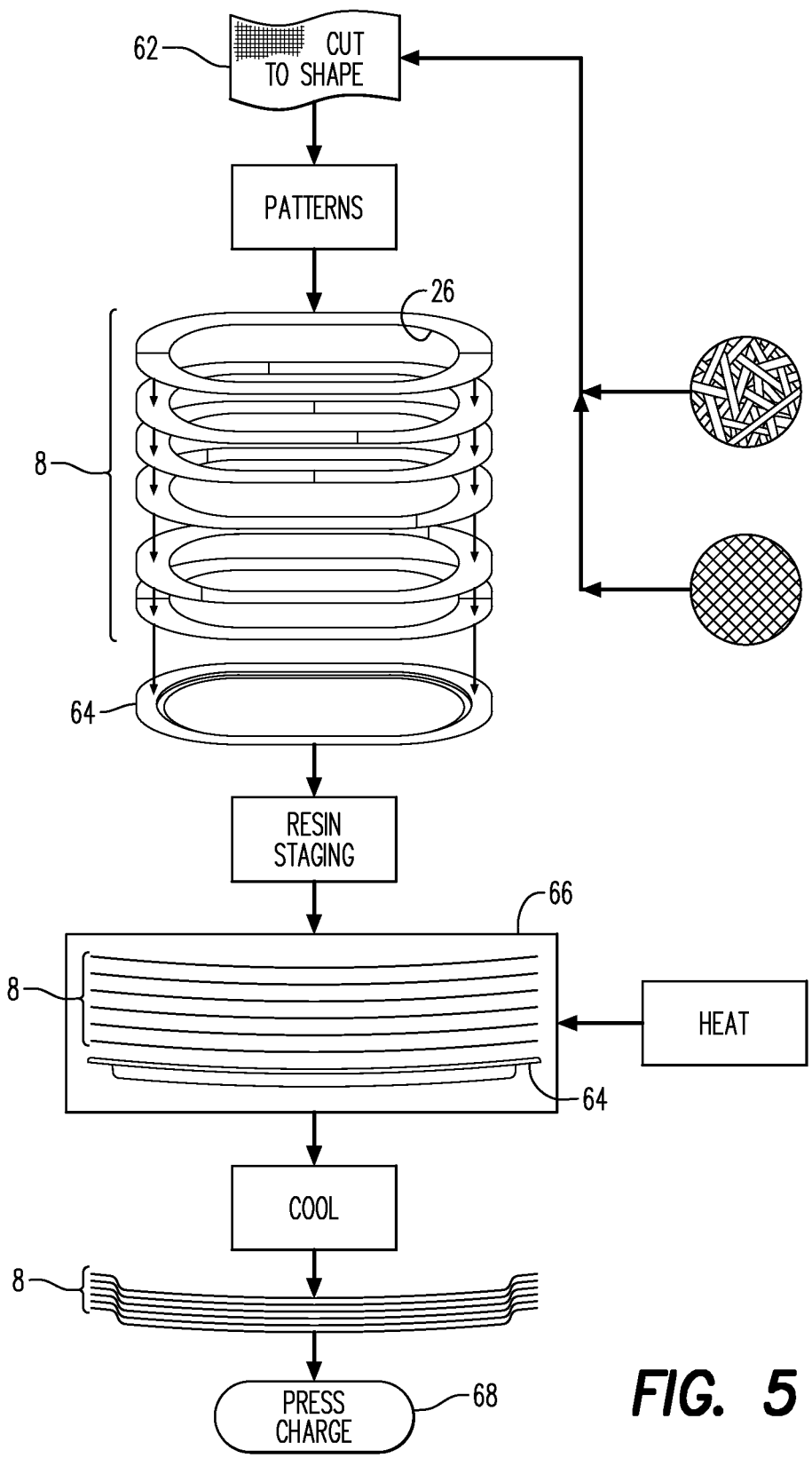
FIG. 5 is a flowchart of the lay-up sequence for fabricating and staging the various layers of the composite window frame.

In FIG. 5, any suitable fiber material 62 may be used for fabricating the composite frame 18 in its generally annular form for its intended operation, such as the exemplary aircraft window frame configuration.

The fiber material 62 can have structural fibers in various composition and configuration for effecting corresponding high strength in the final frame in desired directions for withstanding operational loads or forces.

Typical reinforcing fibers include carbon, fiberglass, or E-glass which can be provided in flexible mat or fabric form with randomly or directionally oriented fibers, shown enlarged in FIG. 5, woven or otherwise made.

The initial fiber material 62 is typically pre-impregnated (prepreg) with a suitable bonding or curable resin 52, such as epoxy or polymer resins, which can be readily cured solid under heat to effect the high strength of the cured prepreg fiber material.

Alternatively, the fiber material 62 may be provided dry, without resin, with the resin 52 being separately applied or injected therein in any conventional manner.

In the annular form of the frame 18 illustrated in FIG. 4, the corresponding fiber layers 8 thereof can be selected and patterned to maximize strength for the intended use as an aircraft window frame in supporting the window pane 20 to the aircraft, and thereby withstanding structural and pressure loads during operation.

FIG. 5 illustrates that the initial fiber material 62, which is preferably pre-impregnated with the curable bonding resin 52, can be cut to shape for the desired pattern, such as the annular ring pattern for the individual layers 8 of the window frame 18.

Multiple resin-impregnated fibrous layers 8 are initially formed in corresponding flat annular patterns each having a central aperture conforming with the intended central aperture 26 of the final frame 18. The flat annular patterns are differently segmented circumferentially as desired for preferentially introducing directional strength to the annular frame 18, including hoop strength therein.

For example, the annular patterns may be segmented vertically, horizontally, or diagonally, with two or more arcuate segments collectively defining each annular pattern, typically with narrow overlaps between segments.

The initially flat prepreg layers 8 are stacked vertically, relative to gravity, in a common stack having the common central aperture 26, preferably atop a contoured work tray 64 that conforms in profile with the outboard side 30 of the frame 18 for example.

Conventional resin staging introduces heat to the flat fibrous layers 8 stacked atop the work tray 64 inside an oven 66 to preform three-dimensional (3D) configurations thereof to conform with the corresponding profiles of the inboard and/or outboard sides 28,30 of the final frame 18.

As shown in FIG. 1, the inboard side 28 of the window frame 18 is vertically concave, whereas the outboard side 30 of the frame 18 is vertically convex, corresponding to the radius of curvature A of the frame in the fuselage 14.

The work tray 64 is preferably upwardly concave along the longitudinal frame post direction to introduce a downwardly convex profile to the stacked layers 8 during staging in which the flexible layers 8 deform under gravity and heat to preform a desired shape or profile thereto under partial curing of the resin 52.

The initially flat layers 8 are thusly preformed to thicker 3D transverse profiles or configurations corresponding generally to the transversely offset rim 22 and sash 24.

After resin-staging, the preformed layers 8 are removed from the oven and cooled to form a collective stack defining a press charge 68. The press charge stack 68 is partially rigid upon cooling, and retains the desired preform shape upon removal from the work tray 64.

Figure 6:
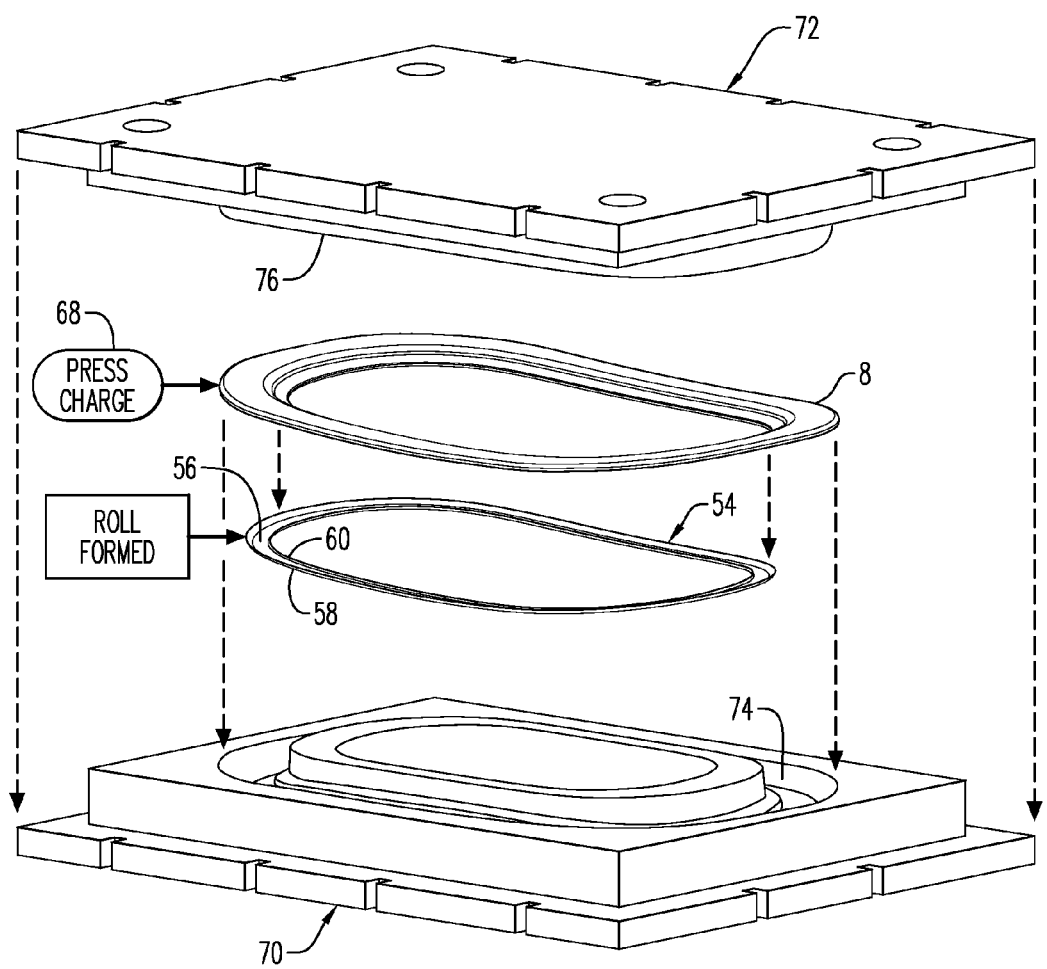
FIG. 6 is a flowchart of the assembly of the separately fabricated preform layers and erosion shield in a pair of compression molding dies.

FIG. 6 illustrates schematically the conventional cold roll forming of the annular metal trim piece 54 that forms the exemplary erosion shield conforming with the annular pattern of the preformed layers 8. The trim 54 is initially thin, flat sheet metal that may be suitably roll formed to plastically create the arcuate brim 58 and clip 60 along radially opposite ends of the middle band 56, which may remain flat.

Figure 7:
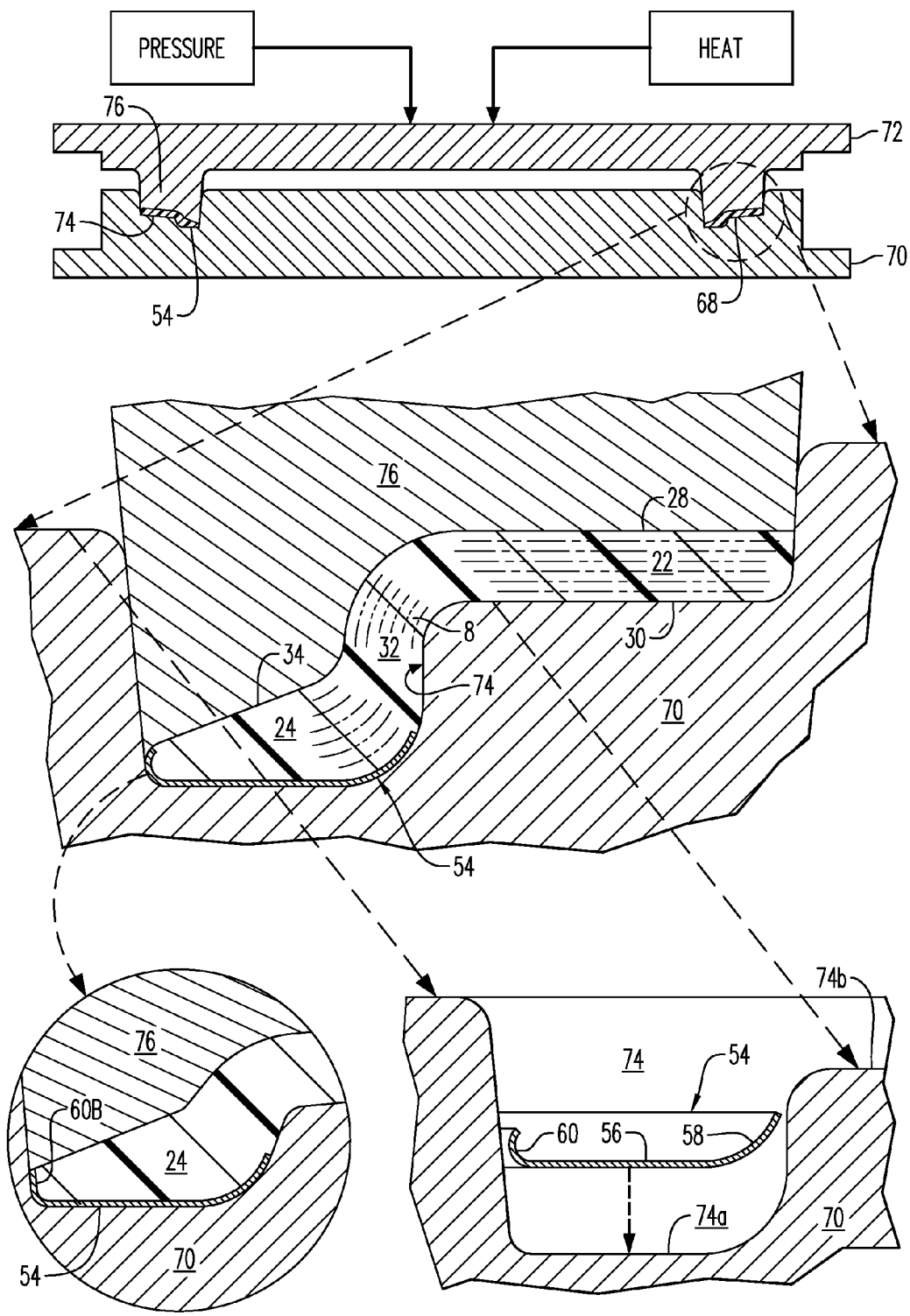
FIG. 7 is a flowchart for compression co-molding directly together the composite preform layers and metal erosion shield illustrated in FIG. 6 in the manufacture of the hybrid window frame.

FIG. 6 also illustrates the improved process in which both the preformed layers 8 and trim 54 are mounted together inside a pair of molding dies or molds 70,72 for collective compression co-molding under high pressure and heat as shown schematically in FIG. 7.

The lower mold 70 includes a solid metal base or body having an annular lower mold channel 74 recessed downwardly in the upper surface thereof. The channel 74 includes an annular first seat 74a shown in more detail in FIG. 7 that conforms in configuration with the trim 54. The first seat 74a includes a complementary flat middle portion and arcuate end portions conforming with the flat band 56 and arcuate brim 58 and clip 60 of the trim 54.

The first seat 74a radially adjoins an annular second seat 74b that conforms in configuration with the corresponding portion of the stacked layers 8 for the frame 18. The radially outer end of the second seat 74b is arcuate and has a suitable transverse radius where it adjoins the sidewall of the channel 74.

Since the first and second seats 74a,b define the lower mold profile, suitable draft is provided therein by the arcuate portions thereof and their non-perpendicular transitions with the slightly leaning adjoining lateral surfaces in transverse section. In this way, the arcuate transitions permit free flow of the resin-impregnated fibrous layers 8 during compression molding by the upper anvil 76. And, the upwardly diverging draft in the lower mold channel 74 permits removal of the compression molded frame from the lower mold 70 following disassembly of the upper mold 72 therefrom.

The lower channel 74, including its adjoining seats 74a,b, has a radially transverse 3D lower profile that conforms with the desired 3D profile of the outboard side 30 of the frame 18 for accurately molding the outboard side of the press charge 68 to embed the trim 54 therein to the desired final outboard profile.

In this way, the trim 54 may be placed first in the lower mold 70 to simply rest in the lower mold channel 74 and is preferentially fixed or trapped therein by gravity. The trim 54 simply rests atop the first seat 74a specifically configured to laterally bound its entire lower surface.

The stacked preform layers 8 may next be placed secondly in the lower channel 74 to simply rest by gravity atop both the first-placed trim 54 and the adjoining second seat 74b specifically configured therefor.

The trim 54 is therefore accurately fixtured or trapped in position atop the first seat 74a, and the stacked preform layers 8 are accurately trapped atop both the trim 54 and the second seat 74b.

Correspondingly, the upper mold 72 shown in FIG. 7 includes a solid metal base or body having an annular anvil 76 hanging or protruding downwardly from the lower surface thereof. The anvil 76 has a radially transverse 3D upper profile at its lower distal end that conforms with the desired 3D profile of the inboard side 28 of the frame 18 for accurately molding the inboard side of the press charge 68 to the desired final inboard profile.

In the modified compression molding disclosed herein, the upper mold 72 is pressed downwardly under typical force and suitable heat atop the lower mold 70 so that the anvil 76 compresses the stack of preformed layers 8 atop the trim 54 to co-mold directly together these components co-bonded by the common cured resin 52 to form the final unitary or one-piece hybrid frame 18.

The lower 3D profile of the lower mold channel 74 accurately molds the outboard side 30 of the hybrid frame 18, with the trim 54 being directly embedded therein and bonded thereto by the cured resin 52 itself. And, the upper 3D profile of the upper mold anvil 76 accurately molds the inboard side 28 of the hybrid frame 18.

The lower mold channel 74 and upper mold anvil 76 extend circumferentially around the common central aperture 26 of the stacked fibrous layers 8 to mold to 3D shape the forward and aft posts 36,38 and the adjoining upper and lower rails 40,42 in the molded frame 18, with the metal trim 54 being simultaneously co-molded with the fibrous layers 8 to form the erosion shield exposed circumferentially along the inner sash 24, and directly embedded therein.

The forward and aft posts 36,38 conform with the curvature radius A of the fuselage 14, and are therefore convex outwardly along their longitudinal length or vertical height. Accordingly, the lower mold channel 74 is concave upwardly along the longitudinal direction to seat the stacked layers 8 downwardly therein and form the convex outboard side of the frame along the two posts 36,38.

The lower and upper 3D profiles of the molds 70,72 also collectively define the transverse 3D configuration of the final frame 18 including the radially outer rim 22 transversely offset by the middle rib 22 from the radially inner sash 24 which concentrically surround the central aperture 26. And, the metal trim 54 provides a suitable erosion shield for protecting the inner perimeter of the frame 18 around its central aperture 26.

No secondary bonding adhesive as found in the original manufacture is required or used for the trim 54, with all layers 8 and trim 54 being collectively joined in a unitary structure having the enhanced strength of the single cured resin 52 itself, reinforced by the embedded fibers and trim piece itself.

Elimination of the secondary bonding adhesive for the trim 54 correspondingly reduces total weight of the final frame 18, and eliminates the extra steps previously required to separately bond the trim to the compression molded fiber layers. Corresponding manufacturing costs are therefore also eliminated.

The work tray 64 used to preform the layers 8 during resin staging has a suitable transverse 3D profile that conforms with the corresponding profiles of the lower and upper molds 70,72, but with correspondingly less accuracy suitable for the intermediate step of preforming. Final accuracy is obtained by the precision profiles of the lower and upper molds 70,72.

The trim 54 is therefore accurately located and directly bonded to the radially inner sash end 24 of the frame 18 and ensures maximum strength of the molded annular frame, especially in the hoop direction thereof, which adds rigidity and strength thereto.

Since the trim 54 is itself formed of flexible sheet metal, it is securely supported in the first seat 74a specifically configured therefor and may thusly withstand the great compression forces applied during molding without undesirable deformation thereof. The first seat 74a also traps in position the trim 54 to prevent undesirable migration thereof in the initially fluid preformed layers 8 as they undergo compression molding under pressure and heat.

The trim 54 is therefore trapped in all degrees of motion vertically, radially, and circumferentially by the closely bounding first seat 74a and its lateral surfaces conforming with the arcuate brim and clip ends 58,60 of the trim 54.

In the exemplary configuration shown in FIG. 7, the first and second seats 74a,b smoothly adjoin together in the lower mold 70 for embedding the trim 54 flush in the outboard surface of the hybrid frame 18. In particular, the trim 54 is molded flush in the sash 24, with the opposite brim and clip ends 58,60 of the trim 54 blending flush with the outer surface of the cured laminates 8.

In one embodiment shown in FIG. 7, the clip 60 extends upwardly inside the lower channel 74 with a transverse arc length greater than 90 degrees. This configuration may be used for the aft post 38 shown in FIG. 4, with the forward post 36 having less transverse arc length, less than or equal to 90 degrees, in an asymmetric configuration of the trim 54.

Alternatively, the radially inner end of the trim 54 may have a generally square or L-shaped clip, designated 60B in FIG. 7, which can be uniform around the full inner perimeter of the trim 54 in a fully symmetrical configuration thereof.

In either embodiment, the trim 54 retains a generally U-shaped transverse section, open upwardly in the lower mold channel 74, which is similarly trapped in the corresponding first seat 74a specifically configured therefor, with the preformed layers 8 being readily placed atop the open trim for compression molding therewith.

The preform layers 8 flow under the pressure and heat of molding to accurately conform with either embodiment of the trim 54 for being bonded directly thereto and flush therewith at both radial ends thereof.

Since the fibrous layers 8 include the central aperture 26, the lower mold channel 74 and the upper mold anvil 76 shown in FIGS. 6 & 7 are annular and conform with the annular pattern of the fibrous layers 8.

Furthermore, the first seat 74a shown in FIG. 7 is disposed radially inwardly of and vertically below the second seat 74b to trap the trim 54 circumferentially along the inner perimeter of the stacked layers 8 to expose radially inwardly the trim 54 embedded in the molded frame 18.

The two seats 74a,b defining the lower mold profile are thusly transversely offset from each other and collectively define with the upper mold profile on the anvil 76 a 3D transverse configuration for the molded frame 18 including the radially outer rim 22 transversely offset by the annular rib 32 bridging the radially inner sash 24 surrounding the central aperture 26.

The lower and upper profiles of the two molds 70,72 converge radially inwardly together along the first seat 74a as shown in FIG. 7 from the second seat 74b to the central aperture 26 to form the tapered pocket 34 in the molded frame 18 for supporting the aircraft window pane 22 in the exemplary window frame application.

Particular advantages of the sheet metal erosion shield or trim 54 are its unitary and fully annular configuration and its thin profile having three dimensional (3D) breadth. These features permit effective manufacture of the shield itself and preferential protection against erosion of the underlying composite window frame when used in the aircraft application flying at high speed.

The thin annular trim 54 enjoys further advantages in its direct bonding to the fiber layers 8 in simultaneous compression co-molding thereof, with the same bonding resin 52 providing a common or unitary structural matrix to enhance rigidity and strength of the unitary molded frame 18 including the embedded trim 54.

Simultaneous co-molding of the fiber laminations and metal trim eliminates the need for any secondary bonding adhesive, and the corresponding additional tools and steps for such secondary bonding and inspection thereof, and therefore significantly decreases production costs.

The resulting hybrid frame 18 is therefore lighter in weight, which correspondingly decreases aircraft weight when many such composite window frames are used in the aircraft application.

The aircraft window frame is a preferred configuration for the hybrid frame for obtaining enhanced collective strength while minimizing frame transverse cross section, including the number of fiber laminations directly bonded to the thin metal trim embedded therein.

Other forms and applications for the hybrid frame may also enjoy various benefits of the co-molding of the fiber laminations and the metal trim using the same matrix resin to directly co-bond together the trim and laminations in a resulting unitary structural ring.

Common to the hybrid frame is the co-molding process in which the metal trim is accurately fixtured or trapped in the structural confines of the U-shaped lower mold channel, with the resin impregnated laminations being similarly trapped thereatop in accurate position and alignment relative thereto.

The complementary upper mold anvil is itself accurately trapped atop the laminations and trim by the lower mold channel to ensure precision molding of the frame under the substantial compression molded forces applied to the two molds.

The resulting hybrid frame is therefore uniquely configured by its co-molding method of manufacture, and enjoys corresponding advantages in structural precision of the fiber embedded metal trim, strength, and reduced weight.

The exemplary aircraft hybrid frame with titanium erosion shield directly embedded in the carbon composite laminations is uniquely different than the conventionally fabricated composite window frame in which the titanium shield is separately bonded to the premolded laminations using the secondary adhesive.

The co-molded composite annular frame and directly embedded trim may therefore have various structural configurations with trim of various metals directly bonded to laminations of various structural fibers sharing the common bonding matrix of various material compositions.

The co-molding process disclosed above provides many benefits in manufacture, and results in a uniquely configured co-molded hybrid frame itself enjoying corresponding benefits not possible in a separately bonded annular frame assembly.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A method of making an annular aircraft window frame comprising:
   forming a stack of fibrous layers in an annular pattern;
   forming an annular metal trim conforming with said annular pattern;
   trapping said trim in a lower mold having a lower mold channel;
   trapping said stacked layers atop said trim in said lower mold channel; and
   pressing an upper mold atop said stacked layers for compression co-molding together in said lower mold said stacked layers and trim to form a hybrid frame.

2. A method according to claim 1 wherein:
   said lower mold channel includes a first seat conforming with said trim, and an adjoining second seat collectively forming a lower mold profile;
   said trim rests atop said first seat, and said stacked layers rest atop both said trim and second seat;
   said upper mold includes an anvil having an upper mold profile; and
   said upper and lower molds are pressed together for compression molding said stacked layers and trim in said hybrid frame with a collective profile complementing said lower and upper mold profiles.

3. A method according to claim 2 wherein:
   said stacked layers include a curable resin; and
   said stacked layers and trim are compression molded together in said molds under heat for directly bonding together said fibrous layers and metal trim by curing said resin in a unitary hybrid frame.

4. A method according to claim 3 wherein said first and second seats smoothly adjoin together in said lower mold for embedding said trim flush in said hybrid frame.

5. A method according to claim 3 wherein:
said fibrous layers include a central aperture;
said lower mold channel and said upper mold anvil are annular and conform with said annular pattern of said fibrous layers; and
said first seat is disposed radially inwardly of and vertically below said second seat to trap said trim circumferentially along the inner perimeter of said stacked layers to expose radially inwardly said trim embedded in said hybrid frame.

6. A method according to claim 3 wherein:
said trim comprises a flat annular band having an arcuate radially outer brim and arcuate radially inner clip; and
said first seat includes complementary flat and arcuate portions conforming with said band, brim, and clip.

7. A method according to claim 3 further comprising:
forming each of said fibrous layers in a flat annular pattern having a central aperture;
stacking together a plurality of said flat layers with a common central aperture therein; and
wherein said lower and upper profiles of said molds collectively define a transverse configuration for said hybrid frame including a radially outer rim transversely offset from a radially inner sash concentrically surrounding said common central aperture.

8. A method according to claim 7 further comprising staging under heat said flat fibrous layers to preform configurations thereof to conform with said lower and upper profiles of said molds.

9. A method according to claim 7 wherein said flat annular patterns are differently segmented circumferentially in said stacked layers.

10. A method according to claim 7 wherein:
said first and second seats are transversely offset from each other for forming an annular rib bridging said outer rim and said inner sash in said hybrid frame; and
said lower and upper profiles converge radially inwardly along said first seat from said second seat to said central aperture to form a tapered pocket in said hybrid frame for supporting an aircraft window pane.

11. A method according to claim 10 wherein said lower mold channel and upper mold anvil extend circumferentially around said common central aperture of said stacked layers to form forward and aft posts and adjoining upper and lower rails in said hybrid frame, with said metal trim forming an erosion shield exposed circumferentially along said inner sash.

12. A method according to claim 11 wherein said hybrid frame includes opposite inboard and outboard sides, and said forward and aft posts are concave inboard and convex outboard, with said lower mold channel conforming upwardly to seat said stacked layers downwardly and form said convex outboard side along said embedded erosion shield.

13. A hybrid frame made by the method of claim 1 including said metal trim directly bonded to said stack of compression molded fibrous layers.

14. A hybrid frame made by the method of claim 4 including said metal trim directly co-bonded flush by said cured resin in said stack of compression molded fibrous layers.

15. A method of making an aircraft window frame comprising:
forming a plurality of resin impregnated fibrous layers in corresponding flat annular patterns having a central aperture;
stacking together said flat layers in a common stack having a common central aperture;
staging under heat said flat layers to preform a thicker configuration thereof;
forming an annular metal erosion shield conforming with said annular pattern of said preformed layers;
trapping said annular erosion shield in a lower mold having a lower mold channel including a first seat conforming with said erosion shield, and an adjoining second seat;
trapping said stacked preformed layers in said lower mold channel atop said erosion shield and said second seat; and
pressing an upper mold atop said preformed layers in said lower mold to compression co-mold together said metal erosion shield and fibrous layers in said aircraft window frame.

16. A method according to claim 15 wherein:
said lower mold channel defines a transverse lower mold profile along said first and second seats;
said upper mold includes an anvil having a transverse upper mold profile; and
said upper and lower molds are compressed together to compression mold said preformed layers and erosion shield in said frame with a collective configuration complementing said upper and lower mold profiles, and including a radially outer rim transversely offset from a radially inner sash concentrically surrounding said central aperture.

17. A method according to claim 16 wherein:
said first and second seats are transversely offset from each other for forming an annular rib bridging said outer rim and inner sash in said window frame; and
said lower and upper mold profiles converge radially inwardly along said first seat from said second seat to said central aperture to form a tapered pocket in said window frame for supporting an aircraft window pane.

18. A method according to claim 17 wherein said first and second seats smoothly adjoin together in said lower mold for embedding said erosion shield flush in said sash.

19. A method according to claim 18 wherein:
said erosion shield comprises a flat annular band having an arcuate radially outer brim and arcuate radially inner clip; and
said first seat includes complementary flat and arcuate portions conforming with said band, brim, and clip.

20. An aircraft window frame made by the method of claim 19 comprising said metal erosion shield directly co-bonded to said radially inner sash by said compression molded resin.

* * * * *